Oct. 29, 1935.  J. BRAUNWALDER  2,019,043
UNIT VALVE MECHANISM
Filed April 14, 1933  2 Sheets-Sheet 1

Inventor
John Braunwalder

Inventor
John Braunwalder

Patented Oct. 29, 1935

2,019,043

UNITED STATES PATENT OFFICE 2,019,043

UNIT VALVE MECHANISM

John Braunwalder, Los Angeles, Calif.

Application April 14, 1933, Serial No. 666,119

5 Claims. (Cl. 123—190)

My invention relates to devices adapted to admit and release gaseous mixtures to and from internal combustion cylinders, and the object thereof is to provide a rotary valve and portblock which can serve in the cyclical functioning of a plurality of adjacent cylinders during each revolution of said valve.

A further object is to produce a rotary valve in which a thin walled tapered shell of extreme hardness and wearability may be employed effectively to make a gastight closure against port openings in which a varied pressure condition exists.

A further object is to produce a unit valve mechanism in which lubrication may be freely and efficiently applied and serve the further object of providing efficient means for supplying a lubricant into the upper portions of expansion cylinders.

A further object is to provide a portblock having an intake chamber which serves the additional purpose of segregating particles of liquid fuel in the incoming gas mixtures and heating same until complete evaporation thereof is accomplished.

A further object is to provide a circular intake chamber which will function efficiently to supply an improved gas mixture to internal combustion cylinders by the dynamic action of the gasses flowing therein.

Figure 1:
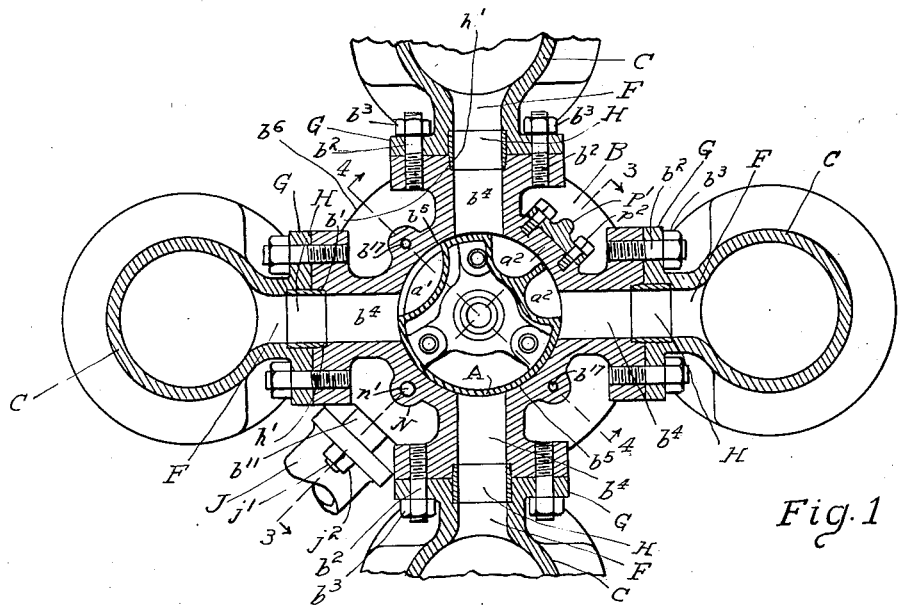
Figure 2:
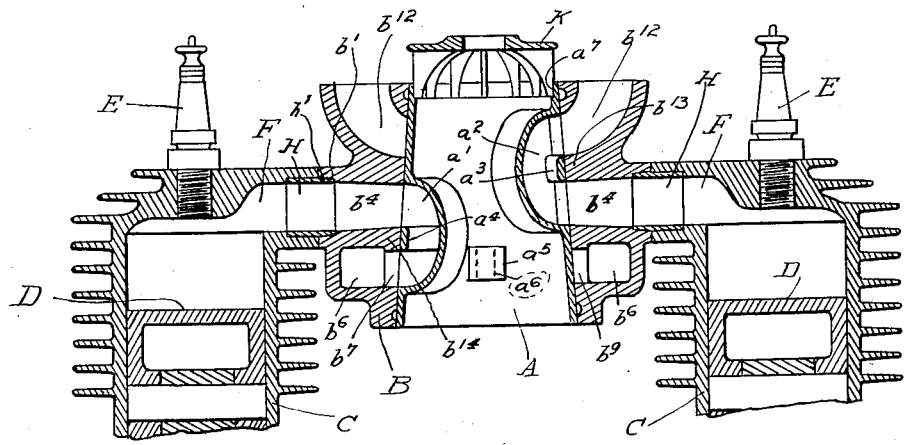

These and other objects will be more fully described in this specification, and are attained by the devices shown in the illustration, in which;

Fig. 1 of Sheet 1 shows a plan section on lines 1—1 of Fig. 2.

Fig. 2 of Sheet 1 shows a cross section of a valve and portblock with portions of internal combustion cylinders attached thereto.

Figures 3, 4:
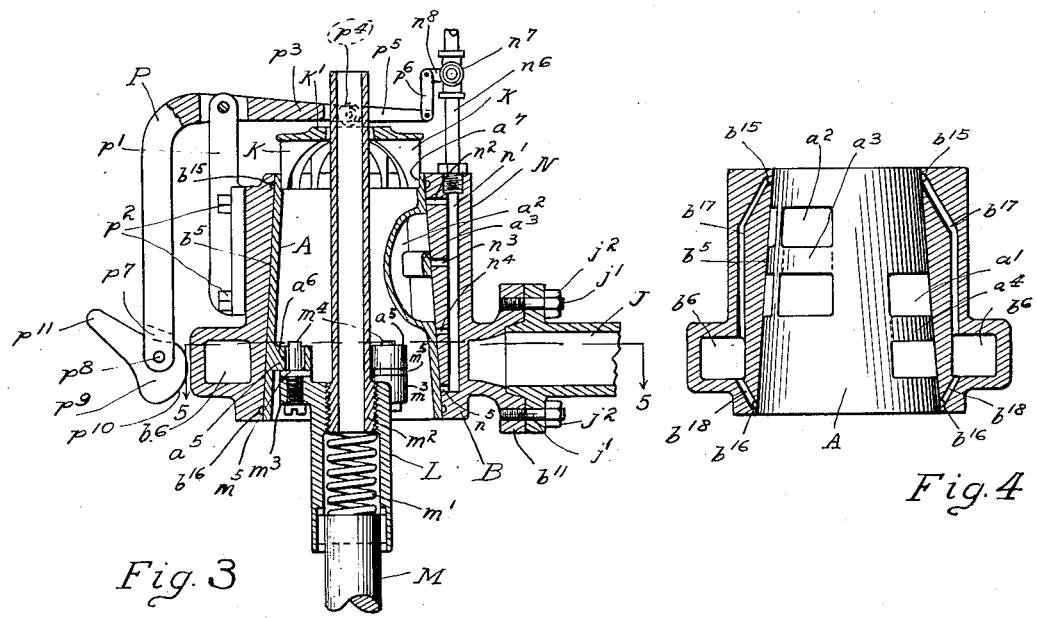

Fig. 3 of Sheet 2 shows a cross section on line 3—3 of Fig. 1.

Fig. 4 shows a cross section on line 4—4 of Fig. 1, with the valve shown in full to show the portages on the exterior thereof.

Figures 5, 6:
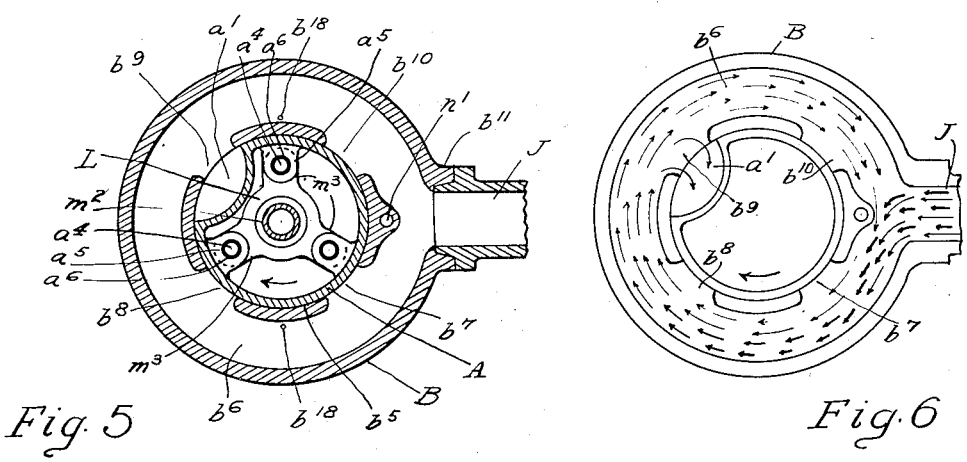

Fig. 5 of Sheet 2 shows a plan section on line 5—5 of Fig. 3.

Fig. 6 of Sheet 2 shows a diagrammatic scheme of gas flow in a circular intake chamber.

Referring to Fig. 2 of Sheet 1, a valve A of a tapered cylindrical shell shape is suitably seated in a portblock B and said portblock B is conveniently secured to a plurality of internal combustion cylinders C which are provided with reciprocating pistons D, an ignition device E, an extended portage F, a connection flange G on the end of said portage F and a thimble H pressed gas tight into said portage F and of which the tapered end $h'$ fits into a tapered seat $b'$ of the portblock B.

Suitable bolts $b2$ and nuts $b3$ provide means for making a gas tight joint at the points of contact between said portblock B and said cylinder C.

The portblock B is provided at its central portion with a plurality of cylinder ports $b4$ which extend from a tapered valve seat $b5$ to the extended portage F on the cylinder C.

A circular intake chamber $b6$ is provided in said portblock B immediately below the cylinder ports $b4$ and terminates on the inner periphery thereof into intake ports $b7$, $b8$, $b9$, and $b10$ and is provided with a connection flange $b11$ to which a supply pipe J may be secured by means of the bolts $j1$ and nuts $j2$.

A plurality of exhaust openings $b12$ are suitably provided above the cylinder ports $b4$.

The valve A is suitably constructed of a tapered cylindrical shell of extremely hard material into which a depressed intake cavity $a1$ and a divided depressed exhaust cavity $a2$ are formed.

A curved bridge member $a3$ is formed over the central portion of the exhaust cavity $a2$ and is adapted to make a complete peripheral gas and oil tight contact against the exhaust abutment $b13$, and a similar curved bridge member $a4$ spans the intake cavity $a1$ at its central portion and makes a gas and oil tight closure against the intake abutment $b14$.

A plurality of driving lugs $a5$ are suitably formed on the inner portion of the valve A and are provided with the driving holes $a6$.

A recess $a7$ is suitably formed at the upper edge of the valve A, and a multiblade centrifugal fan K is suitably secured therein and is adapted to eject air from the interior of said valve A.

A valve drive member L is suitably mounted axially with the valve A and is provided with a drive shaft M at the lower portion thereof which is rotatably mounted in fixed relation to the portblock B.

A suitable spring $m1$ is adapted to bear on said drive shaft M and supports an adjustment member $m2$ which is suitably threaded into the upper portion of the drive member L.

A plurality of driving lugs $m3$ are formed on the upper portion of the drive member L and are provided with the driving pins $m4$ which extend upwardly into the driving holes $a6$.

A resilient washer $m5$ provides a cushioned contact between the driving lugs $m3$ on the drive member L and the driving lugs $a5$ on the valve A and provides suitable resiliency for any slight oscillation due to axial misalignment of the valve A with respect to the axis of the drive shaft M.

An oil chamber N is formed axially on the portblock B in which an oil hole $n1$ is drilled and a plurality of oil holes $n2$, $n3$, $n4$, and $n5$ are drilled radially towards the valve seat $b5$ from said oil hole $n1$ and a suitable oil supply pipe $n6$ is threaded into the oil hole $n1$ and is provided with a suitable oil supply valve $n7$.

A forked lever P is pivotally mounted on the bracket $p1$ which is secured to the exterior of the portblock B by means of the bolts $p2$ and the forked portion $p3$ is provided with suitable rollers $p4$ which are adapted to roll on the top surface $k1$ of the centrifugal fan K, and an extension arm $p5$ formed on an arm of the forked portion $p3$ connects by means of a link $p6$ with the valve arm $n8$ of the oil supply valve $n7$.

A downwardly extended fork $p7$ on the lever P has pivotally supported therein by a pin $p8$, a cam $p9$, which is provided with a cam edge $p10$ which is adapted to bear against the exterior surface of the intake chamber $b6$ of the portblock B.

When said cam $p9$ is rotated by a downward motion of the cam arm $p11$ the pivotable forked lever P is slightly rocked on the bracket $p1$ and thereby depresses the valve A free from the seat $b5$ of the portblock B and simultaneously closes the oil supply valve $n7$ to prevent a wastage of oil through the opening thus formed between the valve A and the valve seat $b5$.

As is more clearly shown in Fig. 4, the valve seat $b5$ of the portblock B is provided near its top and bottom ends with the oil scavenging grooves $b15$ and $b16$, and an oil duct $b17$ which communicates with the groove $b15$ and the circular intake chamber $b6$, and an oil duct $b18$ communicates with the groove $b16$ and said intake chamber $b6$ and these provide means for complete scavenging of all surplus oil from said valve seat $b5$ by the partial vacuum which is formed in said intake chamber $b6$ during the intake cycle in the cylinder C and serves the additional purpose of supplying a lubricant in the upper portion of said cylinder C in ample and time measured quantity.

As is usual in all high speed internal combustion engines, a gas mixture is supplied by a carbureter or the like and liquid fuel supplied by said carbureter into the inflowing air volume may not be completely vaporized, and often such liquids may recondense through the lowered temperatures developed by vaporization and thereby greatly alter the desired gas mixtures coming into the combustion cylinders.

A means of segregation and retention of said liquid fuel particles is conveniently and inherently accomplished by the centrifugal action of the incoming gas mixture in the intake chamber $b6$, and as said incoming gas mixture may attain velocities up to twenty thousand feet per minute, the inertia of the incoming particles of liquid fuel causes same to be thrown against the outer wall of said circular intake chamber which becomes partially heated by convection from the cylinder ports $b4$ and which serves to rapidly vaporize said particles of liquid fuel.

As the intake ports are on the inner periphery of said intake chamber, only the fully vaporized gas which has approximately the same density as that of the inflowing air, can pass through said intake ports $b7$ to $b10$ and a thorough admixture is provided by the high velocity which is established in said circular intake chamber by the successive flow of gas mixture through the ports $b7$, $b8$, $b9$, and $b10$ and this action is diagrammatically illustrated in Fig. 6, where the approximate flow of mixture is represented by arrows, the heavy short arrows representing particles of liquid fuel and the light long arrows representing completely vaporized gas mixture.

As the peripheral valve speed is approximately one-sixth to one-eighth of the incoming gas mixture velocity, it can be shown that much of the gas mixture will be compelled to recirculate in the intake chamber after it passes the intake port $b10$ by the inertia developed therein and thus automatically maintains a continuous circular motion in said intake chamber during the operation thereof.

A unit mechanism of this type therefore provides novel features which are desirable in the operation of internal combustion engines and any number of cylinders which can be attached thereto may be efficiently functioned for the cyclical periods therein, viz; intake, compression, expansion and exhaust, by each revolution of the valve A, and effective means are provided in said unit valve mechanism when desired, to prevent the cyclical action thereof by depressing said valve A from contact with the tapered valve seat $b5$.

This feature is highly desirable in particular in engines where groups of such cylinders are functioned by a plurality of such unit valve mechanisms and which provides easy means of starting or stopping such engines by releasing compression pressures in any or all groups of cylinders.

Having thus described my invention and its mode of operation, what I claim, and desire to secure by Letters Patent, is;

1. In a unit, valve mechanism, a rotatable valve of tapered cylindrical shell construction provided with flexible driving means and resilient means for seating same, means for unseating said valve comprising a forked lever adapted to depress said valve from its seat and locking means on said forked lever adapted to hold said valve unseated.

2. In a unit valve mechanism, a portblock provided with means for attaching cylinders of internal combustion engines thereto, a tapered valve seat in said portblock, cylinder ports extending from said valve seat to said cylinders, a circular intake chamber provided below said cylinder ports, means for securing a gas mixture supply thereto, intake ports leading from said intake chamber to said valve seat, exhaust ports leading from said valve seat, said intake ports, cylinder ports and exhaust ports situated in axial alignment on said portblock, a tapered valve of cylindrical shell construction provided at its periphery with depressed intake and exhaust cavities, a curved bridge member adapted to form a gas and oil tight closure against said valve seat, an oil chamber provided on said portblock, an oil hole formed therein, and oil holes leading from said oil hole to said valve seat at points of continuous peripheral contact of said valve with said valve seat, scavenging oil grooves on said valve seat near the ends thereof, ducts leading from said grooves to a gas mixture intake chamber, means for depressing said valve from said valve seat and simultaneous means for closing an oil supply to said valve seat.

3. In a unit valve mechanism, a valve of tapered cylindrical shell construction provided at its periphery with depressed intake and exhaust cavities, curved bridge members formed over said intake and exhaust cavities adapted to form a gas and oil tight closure against a valve seat, a plurality of driving lugs formed on the interior of said valve, a driving member adapted to flexibly engage said driving lugs, flexible means for rotating said driving member, a spring adapted to resiliently seat said valve, a recess formed at one end of said valve, a centrifugally operative fan secured thereto, means for lubricating said valve at points of continuous peripheral contact with said valve seat, means for depressing said valve from said valve seat and simultaneous means for closing said lubricating means and means for locking said valve in said depressed position.

4. In a unit valve mechanism, centrifugal means for segregating particles of liquid fuel from incoming gas mixtures, means for vaporizing said particles of liquid fuel and remixing the vapors thereof with the incoming gas mixture to equalize same, a rotatable valve adapted to supply said gas mixtures to cylinders of an internal combustion engine, said rotatable valve adapted to serve the cyclical functioning of said cylinders, said rotatable valve resiliently seated and rotated by flexible driving means, means for lubricating said valve, means for removing waste or excess oil from the valve seat in which said valve rotates, means for drawing said waste or excess oil into the upper portion of said cylinders to lubricate same, means for depressing said valve from said valve seat to prevent the cyclical functioning thereof and simultaneous means for closing said lubricating means to said valve.

5. In a unit valve mechanism, a valve rotatably and resiliently mounted in a portblock, a flexible driving means comprising a rotatable shaft, a valve drive member slideably connected thereto, and flexibly to said valve, an oil supply adapted to lubricate said valve, means for unseating said valve and concurrent means for preventing a flow of oil to said valve when same is unseated.

JOHN BRAUNWALDER.